United States Patent
Hable et al.

(10) Patent No.: US 8,773,366 B2
(45) Date of Patent: Jul. 8, 2014

(54) TOUCH SENSITIVE DEVICE USING THRESHOLD VOLTAGE SIGNAL

(75) Inventors: Brock A. Hable, Woodbury, MN (US); Billy Lee Weaver, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 598 days.

(21) Appl. No.: 12/618,874

(22) Filed: Nov. 16, 2009

(65) Prior Publication Data
US 2011/0115717 A1 May 19, 2011

(51) Int. Cl.
*G09G 3/04* (2006.01)
*G06F 3/041* (2006.01)
*G06F 3/044* (2006.01)

(52) U.S. Cl.
CPC .............. *G06F 3/044* (2013.01); *G06F 3/0418* (2013.01); *G06F 3/0416* (2013.01)
USPC .......................................... 345/173; 345/174

(58) Field of Classification Search
None
See application file for complete search history.

(56) References Cited

U.S. PATENT DOCUMENTS

| | | |
|---|---|---|
| 3,732,369 A | 5/1973 | Cotter |
| 4,071,691 A | 1/1978 | Pepper, Jr. |
| 4,175,239 A | 11/1979 | Sandler |
| 4,323,829 A | 4/1982 | Witney et al. |
| 4,581,483 A | 4/1986 | Ralston |
| 4,639,720 A | 1/1987 | Rympalski et al. |
| 4,686,332 A | 8/1987 | Greanias et al. |
| 5,006,952 A | 4/1991 | Thomas |
| 5,189,417 A | 2/1993 | Caldwell et al. |
| 5,305,017 A | 4/1994 | Gerpheide |
| 5,349,353 A | 9/1994 | Zrilic |
| 5,374,787 A | 12/1994 | Miller et al. |
| 5,488,204 A | 1/1996 | Mead et al. |
| 5,526,294 A | 6/1996 | Ono |
| 5,572,205 A | 11/1996 | Caldwell et al. |
| 5,730,165 A | 3/1998 | Philipp |
| 5,790,106 A | 8/1998 | Hirano et al. |
| 5,790,107 A | 8/1998 | Kasser |
| 5,801,340 A * | 9/1998 | Peter ........................ 178/20.04 |
| 5,825,352 A | 10/1998 | Bisset et al. |
| 5,861,583 A | 1/1999 | Schediwy et al. |

(Continued)

FOREIGN PATENT DOCUMENTS

| | | |
|---|---|---|
| EP | 178157 | 4/1986 |
| FR | 2774497 | 8/1999 |

(Continued)

OTHER PUBLICATIONS

Analog Devices AD7142/AD7142-1, Rev. PrD. "Programmable Capicatance-to-Digital Converter with Environmental Compenstion", 2005 Analog Devices, Inc. pp. 1-64.

(Continued)

*Primary Examiner* — Joseph Haley
(74) *Attorney, Agent, or Firm* — Robert S. Moshrefzadeh

(57) ABSTRACT

A touch sensitive apparatus having a plurality of drive electrodes and a plurality of receive electrodes, the drive electrodes and receive electrodes capacitively coupled to each other. A touch measurement circuit configured to identify touch events on the touch sensitive device by comparing a first time period to a second time period. The first time period can be, for example, representative of a length of time a periodic receive signal carried by a receive electrode is above or below a threshold voltage level.

25 Claims, 13 Drawing Sheets

(56) References Cited

U.S. PATENT DOCUMENTS

| | | | |
|---|---|---|---|
| 5,867,111 A | 2/1999 | Caldwell et al. | |
| 5,920,309 A | 7/1999 | Bisset et al. | |
| 6,075,520 A | 6/2000 | Inoue et al. | |
| 6,239,389 B1 | 5/2001 | Allen et al. | |
| 6,452,514 B1 | 9/2002 | Philipp | |
| 6,466,036 B1 | 10/2002 | Philipp | |
| 6,535,200 B2 | 3/2003 | Philipp | |
| 6,879,930 B2 | 4/2005 | Sinclair | |
| 6,885,365 B1 | 4/2005 | Kang | |
| 6,888,536 B2 | 5/2005 | Westerman | |
| 6,970,160 B2 | 11/2005 | Mulligan et al. | |
| 7,129,714 B2 | 10/2006 | Baxter | |
| 7,148,704 B2 | 12/2006 | Philipp | |
| 7,265,746 B2 * | 9/2007 | Knowles et al. | 345/173 |
| 7,274,353 B2 | 9/2007 | Chiu et al. | |
| 7,292,229 B2 | 11/2007 | Morag et al. | |
| 7,453,444 B2 | 11/2008 | Geaghan | |
| 7,830,157 B2 | 11/2010 | Geaghan | |
| 8,077,161 B2 * | 12/2011 | Kinoshita et al. | 345/174 |
| 2001/0006369 A1 | 7/2001 | Ely | |
| 2003/0076306 A1 | 4/2003 | Zadesky et al. | |
| 2003/0122432 A1 | 7/2003 | Caldwell | |
| 2004/0004488 A1 | 1/2004 | Baxter | |
| 2004/0119701 A1 | 6/2004 | Mulligan et al. | |
| 2004/0178997 A1 | 9/2004 | Gillespie et al. | |
| 2005/0150697 A1 | 7/2005 | Altman et al. | |
| 2006/0012581 A1 | 1/2006 | Haim | |
| 2006/0022959 A1 | 2/2006 | Geaghan | |
| 2006/0092142 A1 | 5/2006 | Gillespie et al. | |
| 2006/0097991 A1 | 5/2006 | Hotelling et al. | |
| 2006/0232567 A1 | 10/2006 | Westerman et al. | |
| 2007/0074913 A1 | 4/2007 | Geaghan et al. | |
| 2007/0074915 A1 | 4/2007 | Chung et al. | |
| 2007/0084645 A1 | 4/2007 | Chung et al. | |
| 2007/0247172 A1 | 10/2007 | Li | |
| 2007/0257890 A1 | 11/2007 | Hotelling et al. | |
| 2007/0268272 A1 | 11/2007 | Perski et al. | |
| 2007/0285365 A1 | 12/2007 | Lee | |
| 2008/0004505 A1 | 1/2008 | Kapit et al. | |
| 2008/0006453 A1 | 1/2008 | Hotelling | |
| 2008/0078590 A1 | 4/2008 | Sequine | |
| 2008/0087477 A1 | 4/2008 | Cho et al. | |
| 2008/0106520 A1 | 5/2008 | Free et al. | |
| 2008/0122802 A1 * | 5/2008 | Furuhashi et al. | 345/174 |
| 2008/0142281 A1 | 6/2008 | Geaghan | |
| 2008/0158167 A1 | 7/2008 | Hotelling et al. | |
| 2008/0158169 A1 | 7/2008 | O'Connor et al. | |
| 2008/0158175 A1 * | 7/2008 | Hotelling et al. | 345/173 |
| 2008/0162996 A1 | 7/2008 | Krah et al. | |
| 2008/0162997 A1 | 7/2008 | Vu et al. | |
| 2008/0165134 A1 | 7/2008 | Krah | |
| 2008/0251299 A1 | 10/2008 | Liao et al. | |
| 2008/0309625 A1 | 12/2008 | Krah et al. | |
| 2009/0009483 A1 | 1/2009 | Hotelling et al. | |
| 2009/0025987 A1 | 1/2009 | Perski | |
| 2009/0066670 A1 | 3/2009 | Hotelling et al. | |
| 2009/0096757 A1 | 4/2009 | Hotelling et al. | |
| 2009/0096758 A1 | 4/2009 | Hotelling et al. | |
| 2009/0194344 A1 | 8/2009 | Harley et al. | |
| 2009/0219258 A1 | 9/2009 | Geaghan et al. | |
| 2009/0244033 A1 | 10/2009 | Westerman | |
| 2009/0284495 A1 | 11/2009 | Geaghan et al. | |
| 2010/0033437 A1 | 2/2010 | Matsubara | |
| 2010/0073323 A1 | 3/2010 | Geaghan | |
| 2010/0149110 A1 | 6/2010 | Gray | |
| 2010/0188345 A1 | 7/2010 | Keskin | |
| 2010/0300773 A1 | 12/2010 | Cordeiro et al. | |
| 2011/0007021 A1 | 1/2011 | Bernstein | |
| 2011/0157080 A1 | 6/2011 | Ciesla | |

FOREIGN PATENT DOCUMENTS

| | | |
|---|---|---|
| GB | 2072389 | 9/1981 |
| JP | 2288122 | 11/1990 |
| JP | 11305932 | 11/1999 |
| JP | 2000-076014 | 3/2000 |
| JP | 2007/052639 | 3/2007 |
| JP | 2007-334690 | 12/2007 |
| JP | 2009-110418 | 12/2007 |
| JP | 2009/192306 | 8/2009 |
| KR | 10-0453971 | 10/2004 |
| WO | WO 2004-019258 A2 | 3/2004 |
| WO | WO 2004-040606 A2 | 5/2004 |
| WO | WO 2006-104745 A2 | 10/2006 |
| WO | WO 2007/017848 A2 | 2/2007 |
| WO | WO 2008/085720 A1 | 7/2008 |

OTHER PUBLICATIONS

Bao et al.; "DOA Estimation Under Unkown Mutual Coupling and Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

"Operational_Transconductance_Amplifier", Creative Commons Attribution-ShareALike [On-Line], [updated on the internet Apr. 15, 2010], URL<http://en.wikipedia.org/wiki/Operational_transconductance_amplifier>.

QMatrix Data Sheet, Mutual Capacitance QT60486_104, 2003, Quantum Research Group, Ltd., pp. 1-30.

SID Conference Presentation, "Low Cost Mutual Capacitance Measuring Circuit", 3M Touch Systems, San Antonio, Texas, 9 pages, © 2009.

U.S. Appl. No. 12/575,860, "Multi-touch Touch Device with Multiple Drive Frequencies and Maximum Likelihood Estimation", filed Oct. 8, 2009.

U.S. Appl. No. 12/652,343, "High Speed Noise Tolerant Multi-touch Touch Device and Controller Therefor", filed Jan. 5, 2010.

U.S. Appl. No. 61/348,173, "High Speed Low Power Multi-touch Touch Device and Controller Therefor", filed May 25, 2010.

* cited by examiner

TOUCH SENSITIVE DEVICE USING THRESHOLD VOLTAGE SIGNAL

FIELD OF INVENTION

This invention relates generally to touch sensitive devices, particularly those that rely on capacitive coupling between a user's finger or other touch implement and the touch device to identify an occurrence or location of a touch.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed between them. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of objects as they are moved across the touch surface.

There are two primary techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch sensors apply a signal to a driven electrode. The driven electrode is capacitively coupled to a receive electrode by an electric field created by the signal. Signal coupling between the two electrodes is reduced by an object in proximity, which reduces the capacitive coupling.

A variety of drive schemes are used to measure signal coupling in mutual capacitance touch screens. In general, factors such as speed of measurement, elegance of electronic solution, and the size of touch screen on which the drive scheme can be implemented are important design considerations.

SUMMARY

The present disclosure concerns a touch sensitive apparatus including a touch sensitive device and a touch measurement circuit. In one embodiment, the touch sensitive device has a plurality of drive electrodes and a plurality of receive electrodes, wherein the drive electrodes are capacitively coupled to the receive electrodes. The touch measurement circuit is configured to identify occurrences of one or more temporally overlapping or simultaneous touches on the touch sensitive device by comparing a first time period to a second time period. The first time period is representative of a length of time a periodic receive signal carried by at least one of the receive electrodes is above or below a threshold voltage level. The threshold voltage in one embodiment is a direct current voltage signal, and in another embodiment is a periodic waveform. In some embodiments, the periodic threshold voltage has the same frequency as the periodic receive signal carried by receive electrodes. In other embodiments, it has a frequency different than the periodic receive signal carried by the receive electrodes. In some embodiments, the threshold voltage waveform is a triangle wave.

The present disclosure includes variations on these devices and methods. For example, various waveforms, such as triangular waveforms, may be used as the threshold voltage signal.

In one embodiment, a touch sensitive apparatus is described, the apparatus comprising a touch sensitive device having a plurality of drive electrodes and a plurality of receive electrodes, wherein the drive electrodes are capacitively coupled to the receive electrodes; a touch measurement circuit configured to identify occurrences of a plurality of temporally overlapping touches on the touch sensitive device by comparing a first time period to a second time period, wherein the first time period is representative of a length of time a periodic receive signal carried by at least one of the receive electrodes is above or below a threshold voltage level. The time periods may be determined by the periodic oscillations of a counter. The second period of time may be a pre-set, pre-determined length of time, or it may be dynamically calculated.

In another embodiment, a method of measuring mutual capacitances in a touch sensitive device having a plurality of drive electrodes and a plurality of receive electrodes is described, the method comprising applying a periodic drive signal to at least one of the drive electrodes for coupling, by mutual capacitance, to at least two of the receive electrodes; determining a first time period, wherein the first time period is representative of the length of time a periodic receive signal carried by the receive electrode is above or below a threshold voltage level; comparing the first time period to a second time period; identifying, in response to comparing, occurrences of a touch or near touch event to the touch sensitive device.

In another embodiment, a circuit is described, the circuit configured to detect the presence of an object in proximity to a first and a second electrode, the first electrode driven with a periodic voltage signal, and the second electrode carrying a periodic voltage signal resulting from the voltage signal on the first electrode capacitively coupling to the second electrode, the presence of the object detected by comparing a first time period to a second time period, wherein the first time period is representative of a length of time the periodic receive signal carried the receive electrode is above or below a threshold voltage level.

In another embodiment, a receive electrode is described, the receive electrode capacitively coupled to another electrode driven with a periodic wave form, the receive electrode coupled to electronics to determine when the capacitive coupling between the receive electrode and the other electrode has changed by comparing a first time period to a second time period, wherein the first time period is representative of a length of time the periodic signal carried on the receive electrode, through capacitive coupling with the other electrode, is above or below a threshold voltage level.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present disclosure may be more completely understood and appreciated in consideration of the following detailed description of various embodiments in connection with the accompanying drawings, in which.

In the following description of the illustrated embodiments, reference is made to the accompanying drawings, in which is shown by way of illustration, various embodiments in which the invention may be practiced. It is to be understood that the embodiments may be utilized and structural changes may be made without departing from the scope of the present invention. Drawings and graphs are for illustration of the disclosure and are not to scale, and in some drawings, dimensions are exaggerated for purposes of illustration.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The following definitions clarify terms used within this disclosure:

Ground (Gnd) refers to a common electrical reference point which may be at the voltage of earth ground, or may be a local common voltage.

Mutual capacitance (Cm) is the capacitance between two electrodes in a touch sensor.

Capacitance to ground is the capacitance between a sensor electrode and ground.

A touch sensor includes one or more electrodes configured to make capacitive contact with a conductive object for the purpose of detection and/or location of the object.

Figure 1:
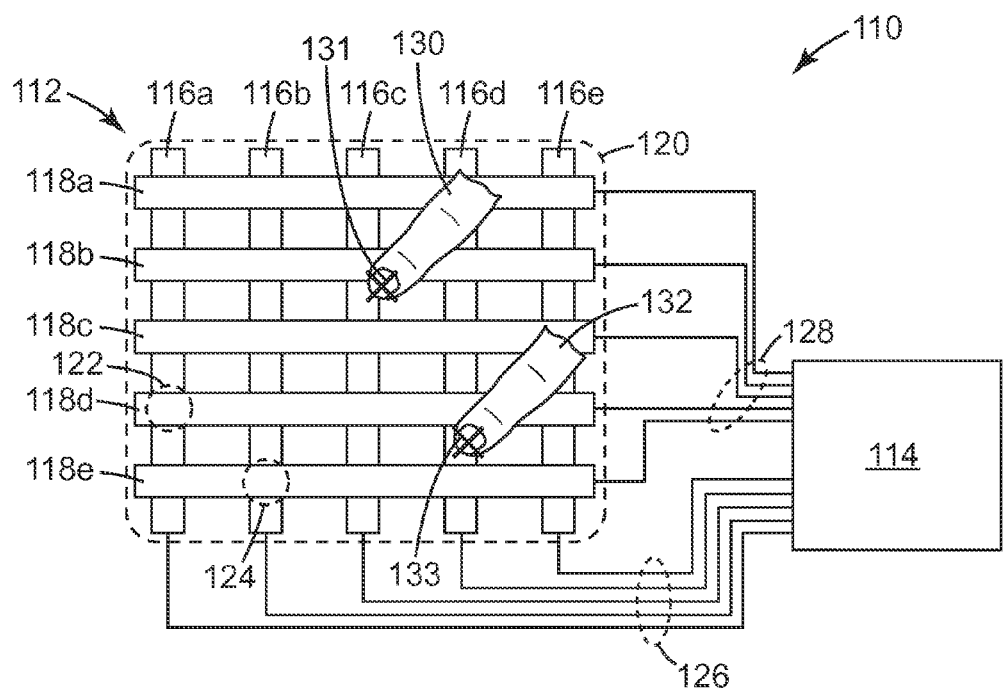
FIG. 1 shows a schematic view of a touch sensitive device and electronics.

FIG. 1 shows exemplary touch device 110. Device 110 includes touch sensitive device (touch panel 112) connected to controller 114, which includes electronic circuitry for sensing touches and possibly near touches occurring in proximity to touch panel 112. Touch panel 112 is shown as having a 5×5 matrix of column electrodes (driven electrodes 116a-e) and row electrodes (receive electrodes 118a-e) but other numbers of electrodes, matrix sizes and electrode configurations can also be used, including putting the driven electrodes on top of the receive electrodes. Any appropriate touch panel size can be used. For example, in one embodiment, a 19-inch (diagonal) touch panel with 40 row electrodes and 64 column electrodes can be used. Touch panel 112 can be substantially transparent so that the user is able to view an object, such as a pixilated display of a computer, hand-held device, mobile phone, liquid crystal display, plasma display, organic light emitting diode display, or other peripheral device, through the touch panel 112. The boundary of touch panel 120 represents touch sensitive area of touch panel 112 and also in one embodiment the viewing area of such a display, if used. In one embodiment, electrodes 116a-e and 118a-e are spatially distributed, from a plain view perspective, over the touch sensitive area of touch panel 120.

For illustrative purposes, the electrodes in FIG. 1 are shown to be wide and obtrusive, but in practice they may be relatively narrow and inconspicuous to a user. Each electrode can be designed to have variable widths, e.g., an increased width in the form of a diamond- or other-shaped pad in the vicinity of the nodes of the matrix in order to increase the inter-electrode fringe field and thereby increase the effect of a touch on electrode-to-electrode (i.e., mutual) capacitive coupling. Electrodes may be composed of, for example, indium tin oxide (ITO), copper, silver, gold, or any other suitable electrically conductive materials. The conductive materials may be in the form of wire, micro-wires, or a conductive layer.

Driven electrodes 116a-e may be in a different plane than the receive electrodes 118a-e (e.g., driven electrodes 116a-e may be underneath receive electrodes 118a-e, and separated by a dielectric layer) such that no physical contact is made between the respective columns and rows. The matrix of electrodes typically lies beneath a cover glass, plastic film, durable coating, or the like (not shown in FIG. 1), so that the electrodes are protected from direct physical contact with a user's finger or other touch object (such as a stylus). An exposed surface of such a cover glass, film, or the like is referred to as the touch surface of touch panel 112.

The capacitive coupling between a given drive and receive electrode is primarily a function of the geometry of the electrodes in the region where the electrodes are closest together. Such regions correspond to the "nodes" of the electrode matrix, some of which are labeled in FIG. 1. For example, capacitive coupling between drive electrode 116a and receive electrode 118d occurs primarily at node 122, and capacitive coupling between drive electrode 116b and receive electrode 118e occurs primarily at node 124.

The 5×5 matrix of FIG. 1 has 25 such nodes, any one of which can be addressed by controller 114 via appropriate selection of one of the control lines 126, which individually couple the respective drive electrodes 116a-e to the controller, and appropriate selection of one of the control lines 128, which individually couple the respective receive electrodes 118a-e to the controller. Though nodes are shown with respect to FIG. 1 as defined by overlapping drive and receive electrodes, they may also be non-overlapping, and instead be defined by an area where the two electrodes come into proximity of one another, and not necessarily overlapping. For example, in some buttons and sliders, such configurations are often used because they do not require multiple layers. Such non-overlapping configurations of drive and receive electrodes may be employed with embodiments described herein.

Drive signals, such as a sinusoidal wave form, are applied to driven electrodes 116a-e. These drive signals produce, through capacitive coupling between driven electrodes 116a-e and receive electrodes 118a-e, receive signals on receive electrodes 118a-e. When finger 130 of a user or other object (such as a stylus) comes into contact or near-contact with the touch surface of touch panel 112, as shown at touch location 131, the finger capacitively couples to the electrode matrix defined by the drive and receive electrodes, thus changing the capacitive coupling between drive and receive electrodes. Changes in signals indicative of changes in capacitive coupling at nodes in the matrix of touch panel 112 may be indicative of a touch event. For example, a touch event at touch location 131 lies nearest the node corresponding to drive electrode 116c and receive electrode 118b. This touch event would cause a change in the mutual capacitance between drive electrode 116c and 118b. Signals indicative of this change in mutual capacitance can be detected by controller 114 and interpreted as a touch at or near the 116c/118b node.

Controller 114 can be configured to rapidly detect signals indicative of changes in capacitance, if any, of all of the nodes of the matrix. Controller 114 is capable of analyzing signals indicative of the magnitudes of capacitance changes for neighboring nodes so as to accurately determine a touch location lying between nodes by interpolation. Furthermore, controller 114 can be designed to detect multiple spatially distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, controller 114 is capable of detecting the positions 131, 133 of both such touches and providing such locations as coordinates to, for example, a computer or other device communicatively coupled to controller 114 (and not shown in FIG. 1). The number of distinct simultaneous or temporally overlapping touches capable of being detected by controller 114 is not limited to 2, and it may be 3, 4, 5, 6, 7, 8, 9, 10, up to 20, or even up to 30 or even more, depending on the size of the electrode matrix and the number of nodes it contains and the algorithm used to process the touches. However, each of these parameters can be varied to accommodate a variety of numbers of simultaneous touches, as discussed in further detail below. Further, touches may originate from different users, a user and an object (such as one or more styli), or any other combination of sources.

Controller 114 can be configured to employ a variety of circuit modules and components that enable it to rapidly determine the coupling capacitance at some or all of the nodes of the electrode matrix, thus resolving a touch event. For example, the controller may include at least one signal generator or drive unit. The drive unit provides a drive signal to one or more drive electrodes 116a-e. The drive signal provided by controller 114 to the drive electrodes may be delivered to one drive electrode at a time, e.g., in a scanned sequence from a first to a last drive electrode. As each such electrode is driven, the controller monitors receive electrodes 118a-e. Controller 114 may include one or more measurement circuits coupled to each of the receive electrodes. For each drive signal provided to each drive electrode, a measurement circuit processes the response signals for each of the plurality of receive electrodes. Changes in the response of signals from the receive electrodes may be indicative of a touch or near-touch event. Methods and circuitry for detecting changes and determining a touch or near-touch event are discussed in further detail herein.

Figure 2:
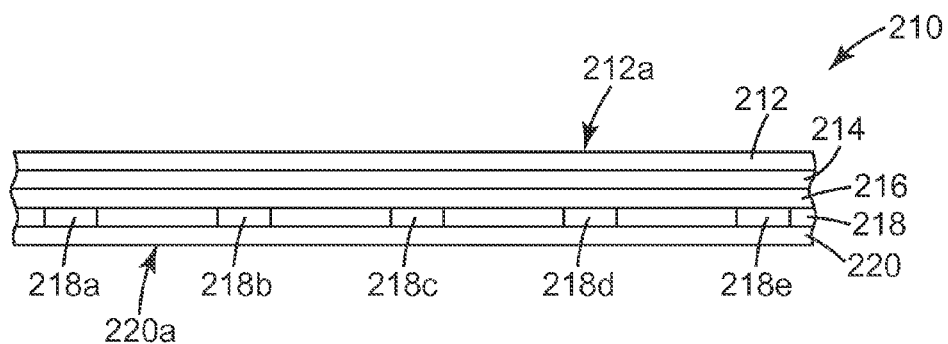
FIG. 2 shows a cross section of a portion of a touch panel used in an exemplary touch sensitive device.

Turning now to FIG. 2, we see there a schematic side view of a portion of a multilayer touch sensor 210 for use in a touch device, such as device 110 of FIG. 1. Touch sensor 210 includes upper layer 212 (which would be the layer closest to the user, and the upper surface 212a of which would define the touch area of a touch sensor), which could be glass, PET, or a durable coating. Upper electrode layer 214 comprises a first set of electrodes. Dielectric layer 216 separates upper electrode layer from lower electrode layer 218, which also comprises a set of electrodes 218a-e, which in one embodiment are orthogonal to the first set of electrodes. In other embodiments, the upper and lower electrodes are not orthogonal to one another. Lower layer 220 may, like the upper layer, be glass, PET, or other material. The exposed surface 212a of upper layer 212, or the exposed surface 220a of lower layer 220, may be or include the touch surface of the touch sensor 210. A drive electrode in a touch sensor can be nearer to the touch surface in a touch sensor than the receive electrode or vice versa. This is a simplified view of the stack that makes up the touch sensor; more or fewer layers are possible.

Figure 3:
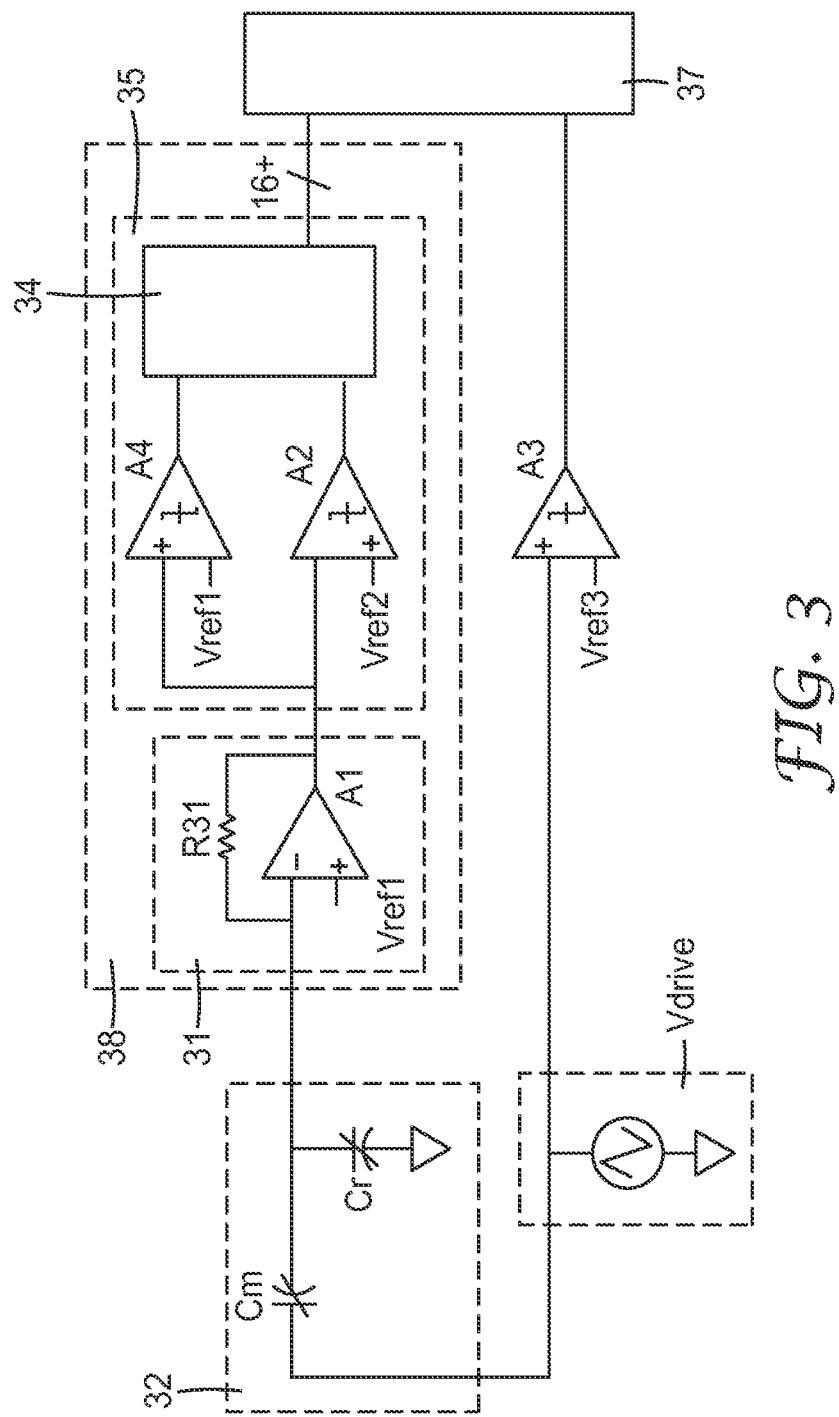
FIG. 3 shows a schematic diagram of an exemplary touch sensitive circuit.

FIG. 3 shows a schematic diagram of an exemplary drive and receive electronics including a receive electronics 38 for measuring signals on a receive electrode coupled to an excited drive electrode. Receive electronics 38 process signals from the receive electrodes to detect a touch or near touch event. In one embodiment, one set of receive electronics 38 is provided for each receive electrode and one drive electrode is driven at a time, and the drive electrodes are driven sequentially. Drive electrodes are individually driven by Vdrive applying a periodic waveform to the drive electrode. The drive signal, then, for a given drive electrode, comprises some number of periods (e.g., in various embodiments, ½, 1, 2, 3, 4, 5, 6, 7, 8, 9, 10, 20, 30, or even more, or any number in between these numbers, including fractions) of the periodic waveform, or some period of time that the periodic waveform is applied to a given drive electrode, as will be discussed further later in this disclosure. After n periods of the periodic waveform have been applied to the drive electrode (or, alternatively, n seconds the periodic waveform has been applied to the drive electrode), the next, possibly (but not necessarily) adjacent drive electrode is driven in the same way. A drive cycle, then, is the length of time, or number of periods, the periodic drive signal is applied to a given drive electrode before the process repeats on the next drive electrode. The drive cycle for a given electrode defines a measurement window in which the signals detected on all receive lines can be measured simultaneously (or as near simultaneously as is possible given the limitations of electronics) by each of the respective measurement circuits. Thus, generally, a drive cycle is applied to a first drive electrode; all receive electrodes are measured; the drive cycle is applied to a second drive electrode; all receive electrodes are measured, and so forth until all drive electrodes have been driven. Sensor cycle time is the amount of time required to apply the drive signal, individually, and possibly (though not necessarily) sequentially, to each drive electrode in the sensor. The approach thus outlined provides very fast sensor cycle times, which may not be required in all deployments.

Sensor cycle time is dependent upon the size of a display, the number of drive electrodes, the frequency of a drive voltage, and the number of periods in a drive cycle. For example, in an embodiment with a 19-inch display and 40 drive electrodes, if a drive voltage has a frequency of 125 kHz, and each drive electrode is driven for 32 periods before cycling to the next drive electrode (drive cycle=32 periods), the refresh rate for the screen is (1/125 KHz)(40)(32), or 10.42 ms. If the number of periods sampled per row is reduced to 16 then, the refresh rate would be 5.12 ms. If the drive cycle is reduced to 16 periods and the drive voltage frequency is increased to 250 kHz then the refresh rate would be 2.56 ms.

Different applications may require different refresh rates. For example, the operating system marketed under the trade name "Windows 7" by Microsoft Corporation of Redmond, Wash., requires a 20 ms "refresh" for each of the touches. The 20 ms time period includes both sensor cycle time and the time required to track touches using an algorithm. The time required to drive each drive electrode for a variety of touch sensor sizes is discussed below. Driving each drive electrode over only one period (i.e., drive cycle=1 period of a sinusoidal wave form applied to driven electrode) would result in a faster refresh; however, driving each drive electrode for four periods allows for better noise compensation, so the examples below assume a sample time of four periods unless otherwise noted.

For a first example showing how fast embodiments described herein may scan through a touch sensor, assume a sensor having a 200 inch diagonal, with a 16:9 aspect ratio. The height of the sensor is 101.85" and the width is 172.12." In this example, assume receive electrodes span the width of the screen. Since the receive electrodes are measured in parallel, the screen height is the limiting factor for refresh. The number of electrodes can thus be calculated by taking the height in mm (2,561.59 mm) divided by a typical sensor electrode spacing, 6 mm. This calculation yields a result of 427 horizontal drive electrodes. If a sensor cycle time of 20 ms is assumed, the drive frequency to reach this refresh rate can be calculated. The equation for the drive portion of refresh time for the sensor is: total drive time=(drive time per period)(samples per drive electrode)(drive electrodes). If the numbers discussed above are used in this equation, drive time per period=20 ms/(427*4)=11.7 µs. Inverting this time determines that a 200" screen can be refreshed in 20 ms using the above settings with a drive frequency of 85.4 kHz. This example is for illustrative purposes, and assumes the full 20 ms can be used for sensor cycle time (and thus does not factor in processing time that may be needed to track touches and provide visual feedback in, for example, a user interface).

In a second example demonstrating maximum theoretical touch screen sizes for which one could expect to practice embodiments described herein, one could start by assuming a drive signal frequency of 250 kHz (drive time per period=4 µs), drive cycle=4 periods, and sensor cycle time=20 ms. Using the equation above: total drive time=(drive time per period)(samples per drive electrode)(drive electrodes), the number of drive electrodes can be calculated using the above assumptions (sub-20 ms refresh rate). The resulting number of drive electrodes is 20 ms/(4 µS*4)=1250 electrodes. If 1250 is multiplied by the typical spacing of the electrodes (6 mm) this results in a vertical height of 7,500 mm or 295.28". The diagonal dimension of the 16:9 or widescreen format screen with 295.28" height would equal 579.84". Depending on requirements, a multiplexer may be used to reduce the number of measurements circuits to some number less than the number of receive electrodes. Thus, certain embodiments described herein have the speed required to support extremely large touch screens.

Returning now to the constituent components of the embodiment shown in FIG. 3, in one embodiment drive signal Vdrive is a sinusoidal drive signal, a number of periods of which are applied to one drive electrode at a time (thus defining a drive cycle), until all drive electrodes have been thus driven, and at which point a scan of the touch sensor is complete (sensor cycle), and the process repeats. Rather than sinusoidal drive signals, a triangle waveform, a sawtooth waveform, square waves, or any other periodic arbitrary waveform may also be used, as will be discussed later. Rather than sequentially exciting the electrodes with drive signals, they may be excited in any order desired.

When a drive electrode is excited, the drive voltage signal Vdrive capacitively couples the drive electrode with the receive electrodes, and capacitor Cm is representative of the (mutual) capacitance between the drive electrode and the receive electrode corresponding to the receive circuit 38 at a node. Capacitor Cr is representative of the capacitance between a receive electrode and ground. Both Cm and Cr change when a conductive object, such as a finger, comes in proximity of the touch sensor. However, the change in Cr has a negligible effect as compared to the change in Cm in this measurement technique. Operational amplifier (op-amp) A1 amplifies the magnitude of the receive signal voltage and can optionally provide an offset DC voltage (Vref1) for the receive voltage signal to eliminate the need for a negative voltage source on all electronics except for the drive signal. Comparator A2 compares the output of op-amp A1 to a threshold voltage (Vref2). If the output of op-amp A1 is greater than the threshold voltage, the output of comparator A2 is a logic high, which could be a variety of voltages depending on the voltage source, for example, 3.3 volts, 5 volts or any other desired voltage level. If the threshold voltage (Vref2) is greater than the output of op-amp A1, the output of comparator A2 is a logic low or zero volts. In one embodiment, then, the output of comparator A2 is a continuous square wave having a duty cycle that is different when there is a touch as compared with the absence of a touch. The square wave is then sampled by a counter in logic block 34 (a microprocessor, for example) to determine the length of time (counts) during each period of a drive cycle that the receive signal exceeds the threshold voltage signal. Comparator A3 transforms the drive electrode voltage into a square wave that defines the drive cycles (i.e., the number of periods of the drive waveform provided to each electrode before moving to the next drive electrode), and is thus used to coordinate sampling by logic block 34. Comparator A3 is not needed if processing unit 37 originates the Vdrive signal or processing unit 37 has some other indication of Vdrive. In the embodiment described in FIG. 3, Vdrive is generated with a dedicated waveform generator chip. Comparator A4 enables use of the receive voltage signal over an entire period for determining the occurrence of a touch when using a periodic threshold voltage signal (rather than a constant DC threshold voltage), such as would be the case for embodiments associated with FIGS. 7-10, and discussed in more detail later. Generally, when using a periodic threshold voltage signal, comparator A4 is configured to provide a signal to logic block 34 indicative of half periods of the receive signal, which logic block 34 uses to signal it should modify its count logic to deal with periodic threshold voltages (and essentially count, for the half period, when the receive signal is lower than the threshold). Or, to put it another way, the output of comparator A4 is one way to signal logic block 34 to count when the absolute value of the threshold voltage exceeds the absolute value of the signal voltage. Optionally, comparator A4 allows logic block 34 to count when the absolute value of the signal voltage exceeds the absolute value of the threshold voltage. Logic block 34 has numerous possible implementations, several of which include:

1. Frequency controlled counter with an enable pin tied with logic to enable counting for case where A2 and A4 are used to enable counting and processing unit (37) provides a signal to reset the counter based on A3.

2. A field programmable gate array (FPGA) implementation in which signals from A2, A4, and A3 enter the FPGA and very high speed integrated circuit hardware description language (VHDL) code is used to implement all counting, storing, and resetting.

3. Application Specific Integrated Circuit (ASIC) developed using the design from implementation 2 above. All, or some portion, of receive electronics 38 would be implemented in the ASIC.

4. Microprocessor implementation, if the conditions are met for A2 and A4, a counter on the microprocessor would be incremented using the frequency of the microprocessor oscillator.

5) The digital signal coming from A2 is filtered and the resulting DC value then measured using an Analog to Digital Converter (ADC).

6) The digital signal coming from A2 is sent into an integrator circuit and then measured using an ADC.

Implementations 5 and 6 would both implement an analog solution to the digital measurement technique of implementation 4. Instead of measuring the output of comparator A2, the digital signal from the comparator would be integrated or filtered resulting in a DC voltage that represents the average voltage of the square wave. For example, if the signal from A2 were a 25% duty cycle square wave and were filtered the resulting DC voltage would be a quarter the comparator's operating voltage.

Logic block 34 and processing unit 37 use the outputs from comparators A2, A3, and A4 to calculate the amount of time the receive signal voltage is above or below a threshold voltage and the time value for each mutual capacitor (node) is used to determine the state of such nodes, and thus the locations of touches to a touch sensor, as discussed in further detail below. When the receive signals and the threshold voltage signals are periodic and, for example, centered at 0V, logic block 34 and processing units 37 use the outputs from comparators A2, A3, and A4 to calculate the amount of time the absolute value of the periodic threshold voltage signal exceeds the absolute value of the receive signal or vice versa. If an offset voltage were used (i.e., the receive signal and/or threshold voltage signal not centered at 0V) the absolute value of the signal would need to be taken with respect to this offset value. While FIG. 3 illustrates one particular embodiment of circuitry used to process a signal from a receive line, one of skill in the art upon reading this disclosure would understand that the circuit illustrated in FIG. 3 can have a variety of configurations within the scope of this disclosure.

Figure 4A:
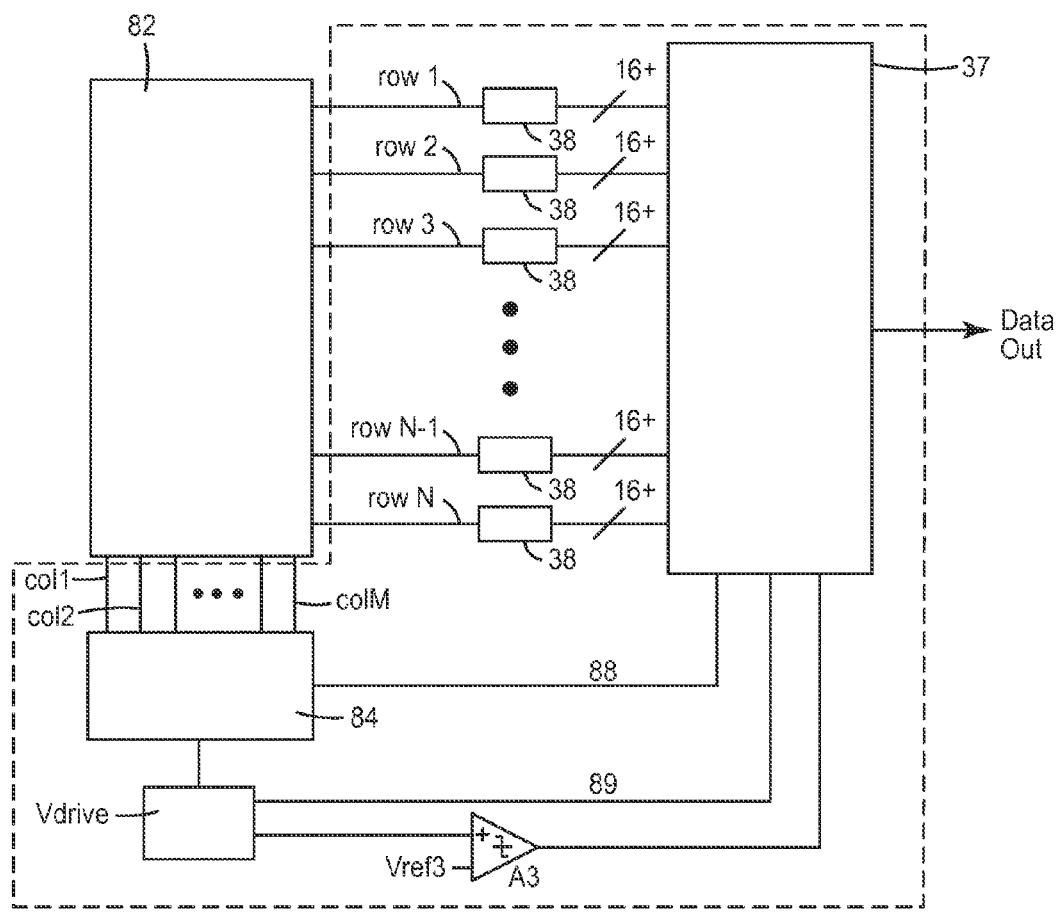
FIG. 4A represents a touch sensor circuit implementation where all the row measurements can occur simultaneously or near simultaneously.

FIG. 4A is an illustration showing an embodiment where all receive (row) electrode measurements occur simultaneously, or near simultaneously. Each receive electrode from touch sensor 82 is connected to receive electronics 38 (FIG. 3) which determines counts associated with a period of time the receive signal is above (or below) a threshold level, and then provides this number to the processing unit 37. Vdrive can be generated using a waveform generator or other electronics and is then amplified as necessary to create a drive signal of acceptable amplitude. Vdrive is then sequentially applied to the columns (col1, col2, ... colM) using analog multiplexer 84. Processing unit 37 controls Vdrive, multiplexer 84, and receive electronics 38. Processing unit 37 uses data collected from receive electrodes to make all calculations pertaining to touches. This embodiment could be implemented using any of the configurations of 34 from above where the processing unit is implemented in the FPGA, ASIC, or microprocessor.

Figure 4B:
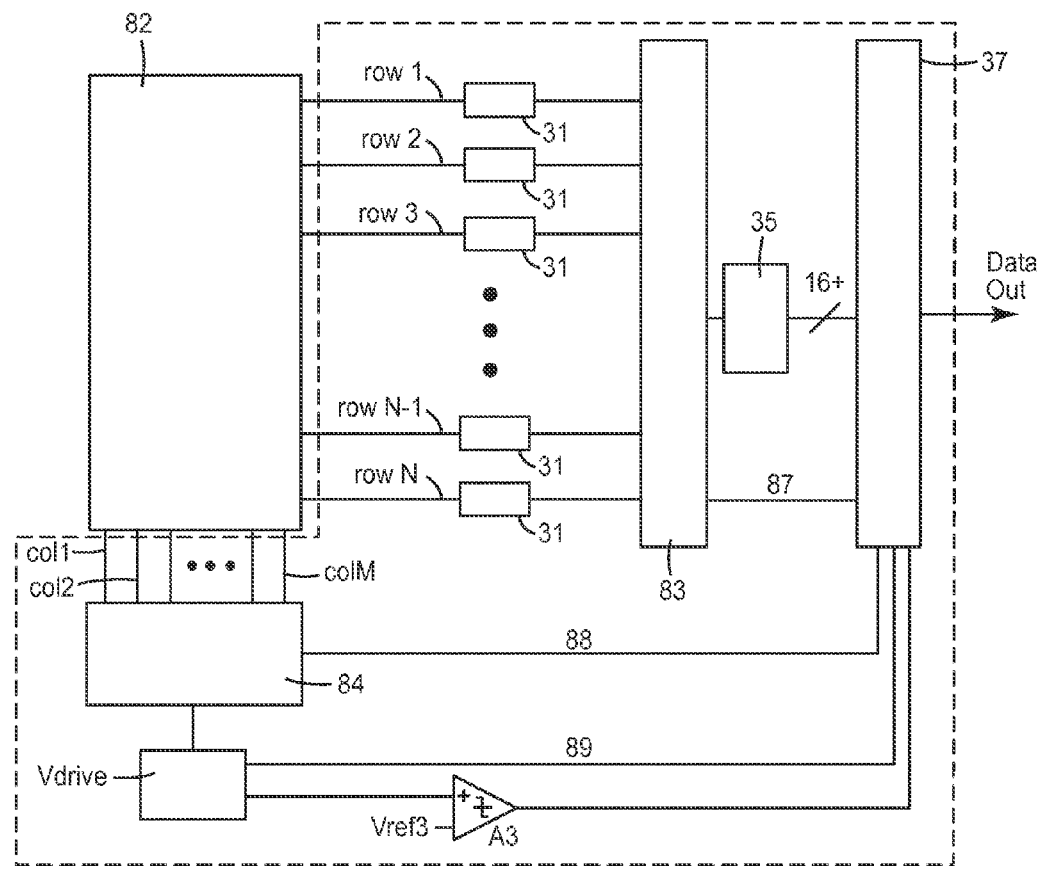
FIG. 4B represents a touch sensor circuit implementation where the outputs of receive circuits are tied to a multiplexer.

FIG. 4B is an illustration showing an embodiment where only amplifier circuit 31 (FIG. 3) (as opposed to all receive electronics 38 as discussed in relation to FIG. 4A) is present on all of the receive electrodes, holding the electrodes at a known voltage (Vref1). Outputs of amplifier circuit 31 for each receive electrode can then be sent into analog multiplexer 83, which provides output associated with one electrode to measure the receive electrodes one at a time. The measurement of the voltage signal on each receive electrode can be completed by measurement unit 35 from FIG. 3. The drive circuitry in the embodiment shown with respect to FIG. 4B is the same in that which is shown with respect to FIG. 4A. If the refresh time and the number of measurements needed were known before hand this configuration could be tailored to meet the predefined design parameters.

Figure 4C:
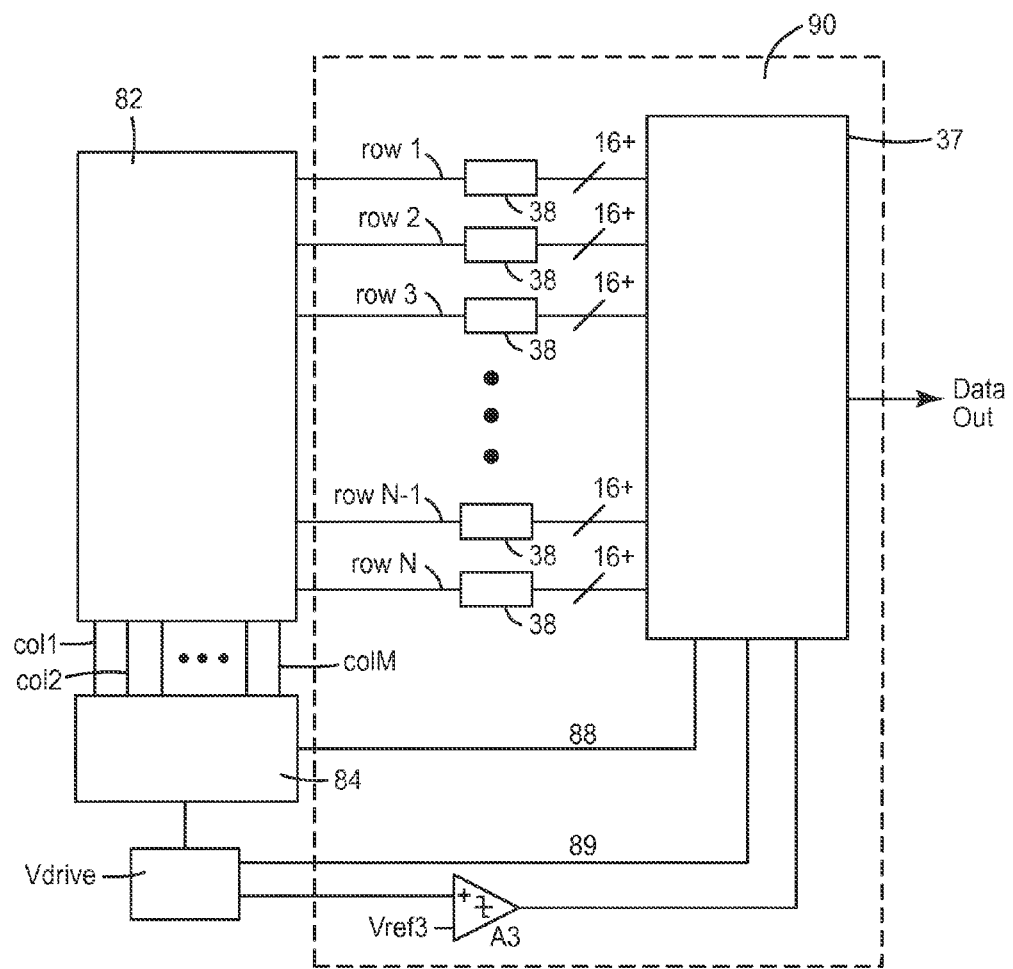
FIG. 4C represents a touch sensor circuit implementation with an ASIC where all the row measurements occur simultaneously or near simultaneously.

As mentioned earlier, receive electronics 38, as well as processing unit 37, could be embodied in an ASIC. Box 90 in FIG. 4C defines components that could be included within the ASIC design. In this configuration, all receive electronics are contained in the ASIC. Control lines for the drive electronics could be provided by the ASIC. When designing such an ASIC, a set number of receive rows would need to be defined for the chip. To accommodate screens larger than the number of defined rows, multiple ASICs could be used. The drive implementation, using multiple ASICs, would still be basically the same, with one ASIC in charge of coordinating drive cycles.

Figure 5:
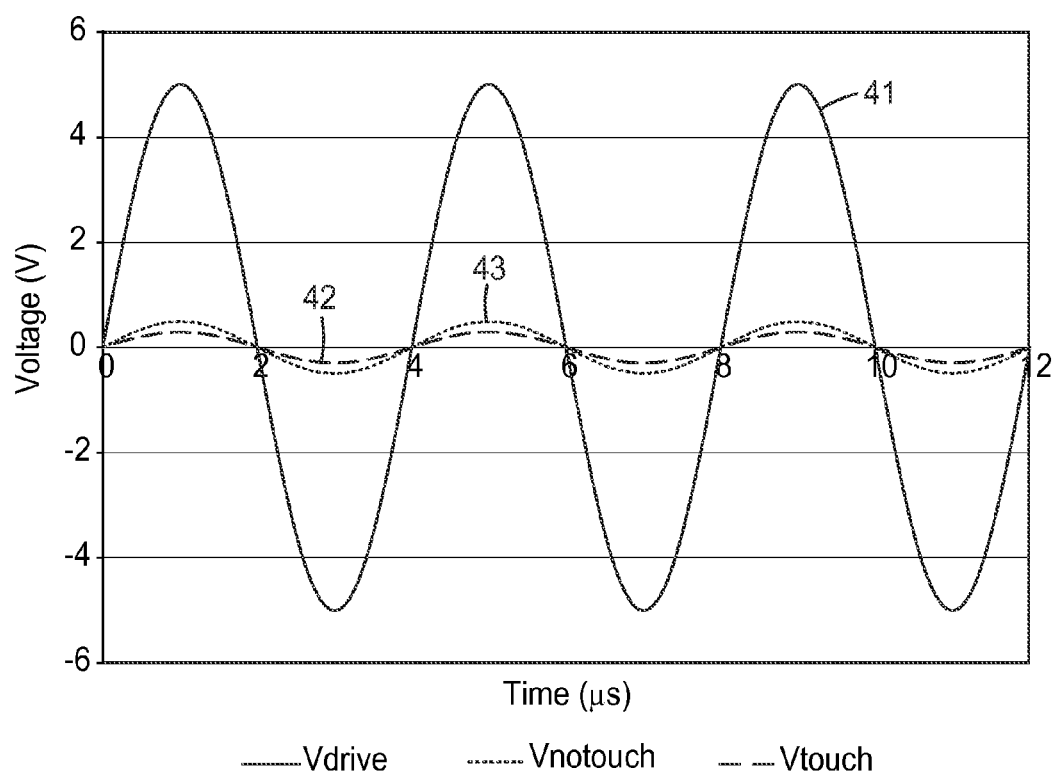
FIG. 5 shows a drive signal, a receive signal in the absence of a touch event, and a receive signal when a touch event occurs.

FIGS. 5-11 show waveforms of simulated voltage signals as would be seen at various nodes of at touch screen, and outputs from various components included in receive electronics 38 of FIG. 3. The simulations were completed using a simulator marketed under the trade name of "OrCAD Capture PSpice 16.0" from Cadence Design Systems, Inc. of San Jose, Calif. A circuit representative of that shown with respect to FIG. 3 was constructed out of simulated electrical components, and drive signals equivalent to those shown in FIGS. 5-11 were applied. The sensor for the simulation consisted of 9 drive bars and 16 receive bars. An op-amp circuit 31 was connected to each of the 16 receive bars. One drive line was driven with a sine wave and the rest of the drive bars were grounded. FIG. 5 shows exemplary drive signal 41 provided to a drive electrode (Vdrive), and the resultant receive signal (42) occurring on a receive electrode with a touch (Vtouch) and signal 43 on a receive electrode in the absence of a touch (Vnotouch). Drive signal 41 was applied to a drive electrode (and corresponds to drive voltage signal Vdrive in FIG. 3). Resultant receive signal 42 (with a touch) and 43 (no touch) are provided from receive electrodes, as the output of op-amp A1 in FIG. 3. While receive signals 42 and 43 are shown as in-phase with drive signal 41 for the purposes of illustration, in practice receive signals 42 and 43 are inverted and 90 degrees out of phase with the drive signal because amplifier circuit 31 (FIG. 3) acts as a negative differentiator circuit. Additionally, while receive signals 42 and 43 are shown as being in phase in FIG. 5, in practice they may be slightly out-of-phase in a physical touch sensor due to the sensor's resistance and capacitance. For illustrative purposes, these phase shifts were eliminated and the differentiated responses were aligned with the drive signals in FIGS. 5-11.

Receive signals 42 and 43 shown in FIG. 5 have been amplified by op-amp A1, and may be referenced to ground (as is the case in FIG. 5), or offset by some voltage. For example, in one embodiment, voltage Vref1 can be approximately 2.5 volts (halfway between ground and a 5-volt power supply to op-amp A1) causing receive voltage signals 42 and 43 to be offset by 2.5 volts, instead of being centered at ground. One advantage of setting voltage Vref1 as a positive voltage is that it may eliminate the need for a negative power supply for op-amp A1 and in some embodiments may reduce the power consumption of receive electronics 38. Receive signal 42 (touch) has lower peak-to-peak amplitude than signal 43 (no touch) because of the decreased capacitive coupling at the particular node associated with this example. As explained this lower peak-to-peak amplitude informs whether a touch is occurring.

Figure 6:
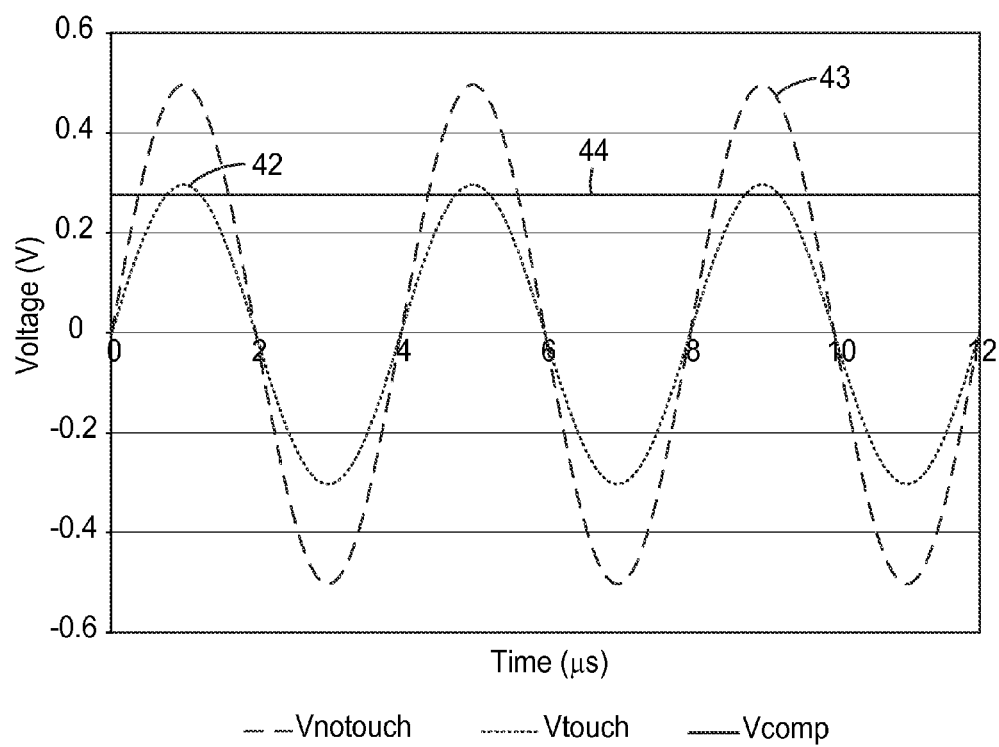
FIG. 6 shows a receive signal in the absence of a touch event, a receive signal when a touch event occurs, and a DC threshold voltage level.
Figure 7:
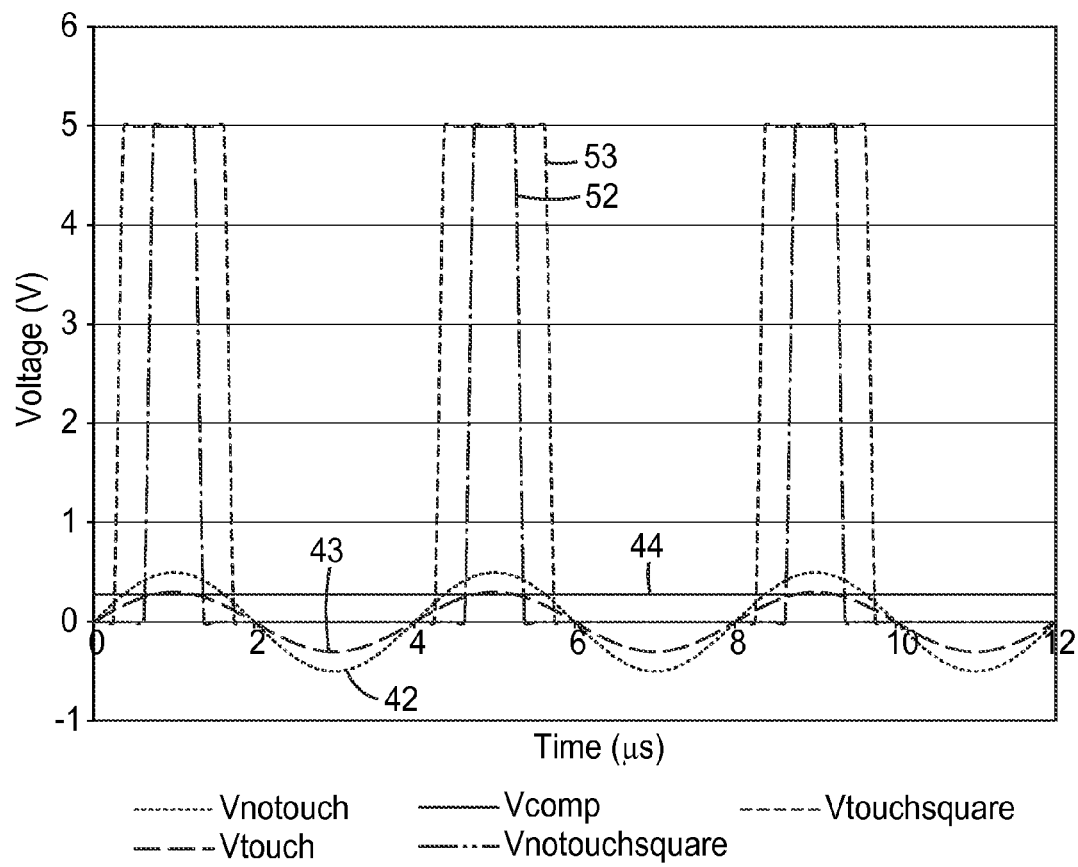
FIG. 7 shows exemplary comparator output corresponding to a receive signal in the absence of a touch event and to a receive signal when a touch event occurs.

FIG. 6 shows a receive signal 43 in the absence of a touch event, a receive signal 42 during a touch event, and a threshold voltage 44, which in the embodiment associated with this figure is a direct current voltage of about 0.275 volts. Threshold voltage 44 corresponds to Vref2 in FIG. 3. Comparator A2 of FIG. 3 compares receive signals 42 and 43 to threshold voltage 44, outputting a logic high or 5 volts when the receive signal is above threshold voltage 44, and a logic low or 0 volts when it is not. The output of comparator A2 is a square wave (as shown in FIG. 7) with a pulse width dependent upon the length of time a receive signal exceeds threshold voltage 44. Threshold voltage 44 can be determined by a calibration method, or can be set at any level. For example, the touch sensor can automatically calibrate threshold voltage level 44 so that the amount of time (as determined by periodic sampling performed by logic block 34) in which a receive signal 42 or 43 is above or below a threshold voltage level 44 remains within a desired range. Such range of time can be measured in terms of "counts" where each count is one sampling instance where the receive voltage is above (or below if the threshold voltage signal is a negative voltage) the threshold voltage. Changes in the number of counts between drive cycles are indicative of a touch or near touch event. In one embodiment, processing unit 37 can be programmed to recalibrate the threshold voltage level 44 if the number of counts migrates outside the desired count range. A desired count range can be based on the frequency of oscillation of a counter within a logic block 34, the number of periods a sampling window extends over and whether the counter is incrementing its count when a receive signal 42 or 43 is above or below the threshold voltage level 44. For example if the drive frequency is 125 kHz, the counter oscillation frequency is 100 MHz, and the samples per drive electrode is 32, the max possible number of counts (CountMax)=(100 MHz/125 kHz) *32=25,600.

The comparison threshold voltage may be adjusted manually or automatically to maximize or at least make sufficient the count difference between a touch and non-touch event. For example, with a DC threshold voltage 44, as shown in FIG. 6, the threshold in one embodiment is close to, but still beneath, the peak voltage of receive signal 42. One approach to this calibration is to detect the peak voltages seen on receive electrodes during a touch event, then, in the case of a DC threshold voltage, offset the DC threshold voltage to some defined offset or percentage below the detected peak. This calibration could be done by a user during a calibration routine, where the user touches various points on the touch screen, or it could be hard set during manufacturing. In one embodiment, the DC threshold is set just above, or at, the peak value of 42, which produces the biggest count difference between a touch and no-touch event. The same principles can be used to adjust a periodic threshold voltage signal to give a maximum, or at least sufficient, difference between counts during touch versus non-touch drive cycles, given the particulars of the touch sensor and the environment in which it will operate within. Each receive electrode may, in some embodiments, be individually calibrated with its own threshold voltage signal. This may be beneficial in some embodiments where particular electrodes are more susceptible to noise than others, or have other characteristics that make them better or worse at signal transmission than other electrodes.

Another approach to calibration, which eliminates the need for user involvement, is to detect the peak voltage seen on the receive electrodes without a touch event, then, in the case of a DC threshold voltage, offset the DC threshold voltage to some defined offset or percentage below the detected peak.

FIG. 7 shows the transformation of receive signals 42 and 43 to square waves 52 and 53, respectively, by comparator A2 (FIG. 3). Comparator A2 has two inputs: voltage Vref2 corresponding to threshold voltage 44 and receive voltage signal 42 or 43. When receive signal 42 or 43 exceeds threshold voltage 44, the output of comparator A2 is a logic high voltage (or logic 1). But if the threshold voltage exceeds the receive signal, the comparator output is a logic low voltage (or logic 0). Alternatively, the inputs to comparator A2 can be reversed so that threshold voltage 44 is tied to the positive input and receive voltage signal 42 or 43 enters the negative input of comparator A2. In this case, the output of comparator A2 will be a logic 1 when threshold voltage level 44 exceeds receive voltage signal 42 or 43 and a logic 0 when receive voltage signal 42 or 43 exceeds threshold voltage level 44.

Referring back to FIG. 3, the output of comparator A2 for each receive electrode in a touch sensor is tied to an input pin of logic block 34. Logic block 34 is programmed to repeatedly sample the output of comparator A2, and thus determine the length of time a receive signal 42 or 43 is above or below the threshold voltage 44. In one embodiment, the logic block determines the length of time by counting the number of oscillations of a counter within a sampling window in which the receive voltage signal 42 or 43 is above or below the threshold voltage. For example, when the drive signal has a frequency of 125 kHz, and the oscillator in the microprocessor has a frequency of 100 MHz, if counting when the square waves are high the count value for a receive electrode with a touch, corresponding to receive voltage square wave 52, is 112. The count value for a receive electrode without a touch, corresponding to receive voltage square wave 53, is 262. If the counter is incrementing when the square waves are low, the count value for a receive electrode with a touch, corresponding to receive voltage square wave 52, is 688. The count value for a receive electrode without a touch, corresponding to receive voltage square wave 53, is 538. These count values are determined by taking the amount of high or low time in microseconds for the square wave (52 and 53) and dividing this time by the period of the 100 MHz oscillator (10 ns).

A drive cycle, and thus a sampling window, may correspond to a single period of oscillation of the drive signal, or it could be any desired number of periods, for example 1, 2, 3, 4, 8, 16, 32, or any other desired number of periods to produce a sufficiently reliable sample size. Considerations in determining the sample size include balancing the refresh rate for a display with the need to compensate for noise that may be present. A larger sample window makes it easier to eliminate effects of noise; however, it decreases the refresh rate of the display. In one embodiment, sampling occurs at a frequency of 100 MHz. To ensure sampling windows correspond with a single or multiple receive period signals, logic block 34 can use the rising edge of the output signal of comparator A3 to signal the beginning of a period and to initiate counting.

There are a variety of ways to process resultant count data, available for each node, that will be apparent to one of skill in the art upon reading this disclosure. For example, when a sampling window spans several periods of the receive signal, the number of counts in each period can be averaged, the number of counts spanning the entire sampling window can be summed, or a rolling average can be used to determine the number of counts in each sampling window. A touch condition would be deemed to be occurring when any of these count values changed by a threshold count value. A predetermined length of time or range of time associated with a count value can be programmed into logic block 34 or processing unit 37 during manufacture, or can be recalibrated periodically based on a variety of factors, including, for example, physical environment. If the counts received were outside of the calibration window and no touches are detected (threshold count value not crossed), then an automatic or manual adjustment could be made to recalibrate and move the no-touch count values back into the calibration window. Waiting for several measurements to be outside of the window without any touch detection would prevent premature recalibration.

Figure 8A:
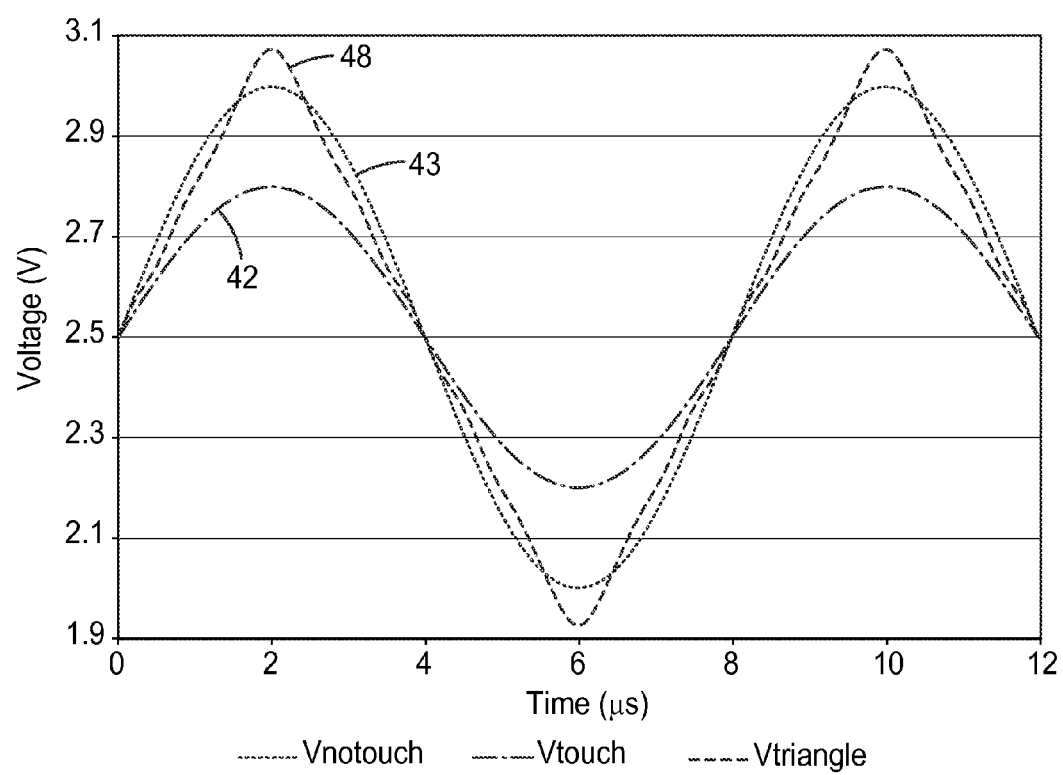
FIG. 8A shows a receive signal in the absence of a touch event, a receive signal when a touch event occurs, and a triangular threshold voltage signal.

FIG. 8A shows waveforms associated with a further embodiment of the present disclosure in which the threshold voltage signal 48 is a periodic triangular waveform instead of being a DC voltage, as was shown with respect to FIGS. 6 and 7. While threshold voltage signal 48 can be any periodic waveform, for example, a sawtooth, a sinusoid, or square waveform, the threshold voltage signal 48 is a triangular waveform having the same frequency as the receive signal. In some embodiments, a triangle waveform used as a threshold voltage will produce a greater difference in counts associated with touch and no-touch conditions. This can be seen in reference to FIG. 8B, which adds an example DC threshold voltage 44 to FIG. 8A. With a DC voltage used as the threshold signal, embodiments disclosed herein continually resolve the difference in counts associated with time window 110 (no touch) and time window 105 (touch). Using a triangular threshold voltage signal waveform, the count difference associated with time window 100 (no touch) and time window 120 (touch) for the same underlying receive signals (42 and 43) becomes much higher.

This higher difference in counts associated with a touch and no-touch state may yield less susceptibility to noise interference as could come from, for example, an LCD display. This higher difference also allows fewer periods of the drive signal to be used in a drive cycle, which means faster response time for the touch sensitive device. Other drive waveforms and threshold voltage waveforms would also have this effect, for example a square drive signal with either a triangular or sine threshold voltage. When the triangle wave is differentiated the resulting receive signal from op-amp A1 (FIG. 3) would be a square wave, which in some embodiments may provide higher count differences between touch and no-touch drive cycles. Other drive signal/threshold voltage signal combinations are possible, so long as they produce different counts in touch versus no-touch states.

Threshold signal 48 is in one embodiment in phase with receive voltage signals 42 and 43, and can have the same frequency or can have a greater frequency than the receive voltage signals 42 and 43. In one embodiment when the threshold voltage signal 48 is periodic, the threshold voltage signal can have a frequency that is an integer multiple of the frequency of the receive signals 42 and 43 as will be seen below with respect to FIGS. 10 and 11.

Figure 8B:
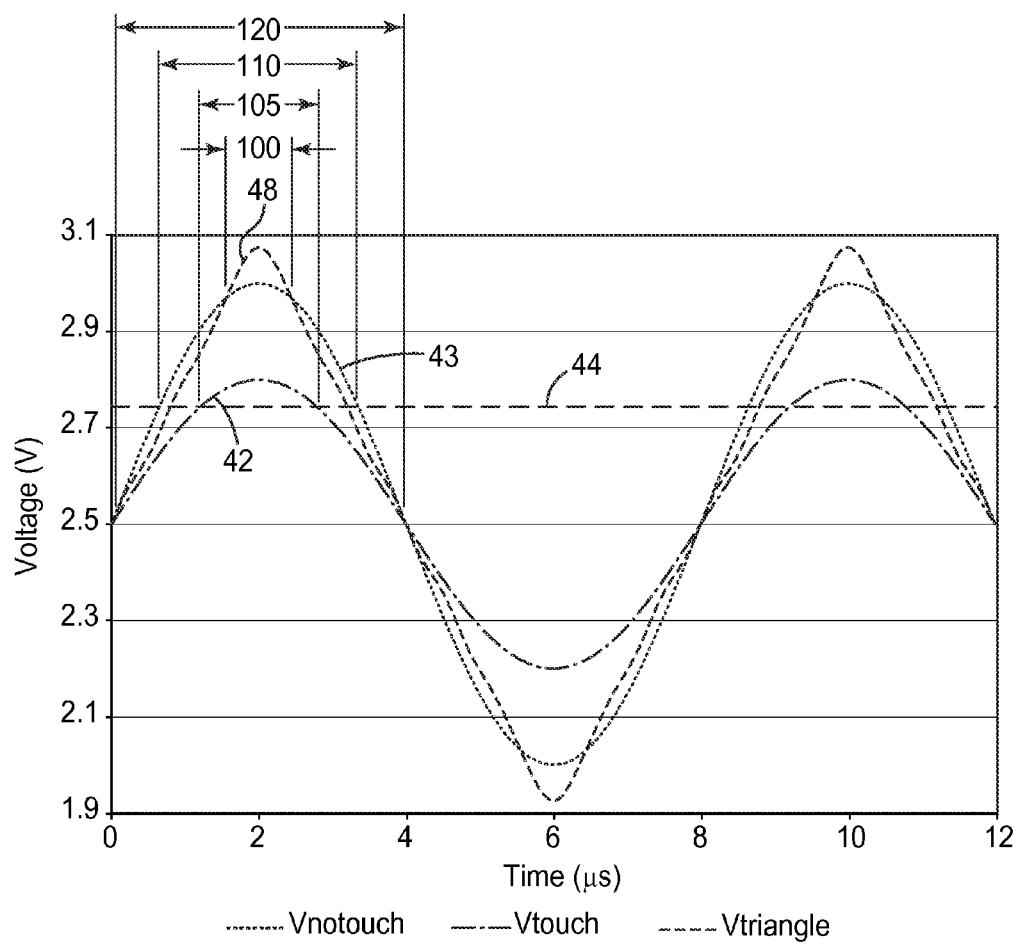
FIG. 8B shows a receive signal in the absence of a touch event, a receive signal when a touch event occurs, and both a DC and a triangular threshold voltage signal.
Figure 9:
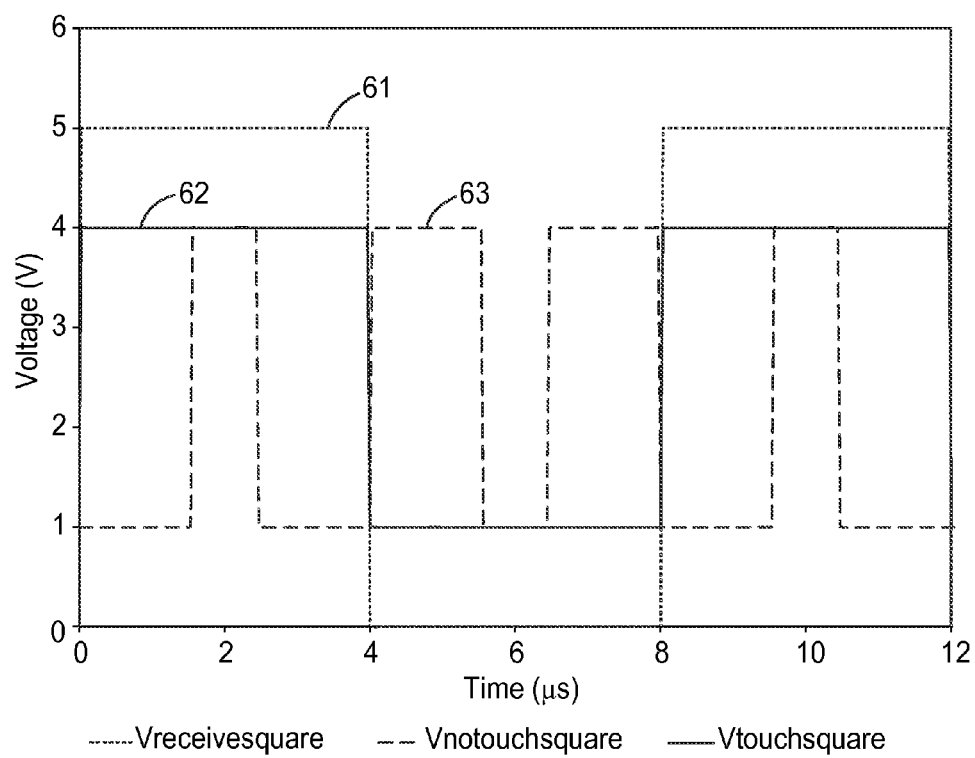
FIG. 9 shows square waves corresponding to a receive signal in the absence of a touch event and a receive signal when a touch event occurs, when a triangular threshold voltage signal is used.

FIG. 9 shows square waves 62 and 63 corresponding to output from comparator A2 in an embodiment where threshold voltage signal 48 is a triangular wave as shown in FIGS. 8A and 8B. Additionally, FIG. 9 shows a square voltage signal 61 from comparator A4 (FIG. 3) used to control logic block counting to determine the length of time a receive signal 42 or 43 is above or below a threshold voltage 48. Comparator A4 has two inputs: one is tied to a reference voltage Vref1, and the second input is tied to the receive voltage signal 42 or 43 on the output of op-amp A1. The output of comparator A4 is a logic 1 when the receive voltage signal 42 or 43 is above voltage Vref1 and a logic 0 when receive voltage signal 42 or 43 is below voltage Vref1. As a result, the output of A4 is a 50% duty cycle square wave that is in phase with receive voltage signal 42 or 43. Logic block 34 can use both the rising and falling edges of this square wave signal 61 to trigger counting for each half of the period of the receive signal when threshold voltage 48 is a periodic signal. An algorithm that can be used by logic block 34 to count in this instance is as follows:

```
if (Vreceivesquare = = 1 and Vtouch/notouch = = 1)
    count up;
else if (Vreceivesquare = = 0 and Vtouch/notouch = = 0)
    count up;
else
    don't count.
```

(Note that in the context of an embodiment based on FIG. 3, Vreceivesquare would be the output of A4, and Vtouch/notouch would be the output of A2.)

This algorithm increases the difference in total counts between a receive electrode with a touch and a receive electrode without a touch, resulting in a higher signal to noise ratio.

FIG. 10 once again uses a periodic triangular waveform as a threshold signal Vref2 (FIG. 3); however, the frequency of the threshold signal 49 is greater than the frequency of the receive voltage signals 42 and 43. In some embodiments, the frequency of threshold voltage signal 49 can be an even multiple of the frequency of voltage signals 42 and 43. Receive voltage signals 42 and 43 are similar to those in FIGS. 5 and 6, except in FIG. 9, receive voltage signals are centered at 2.5 volts. This offset voltage is created by tying voltage Vref1 to a 2.5 volt DC signal.

Figure 10:
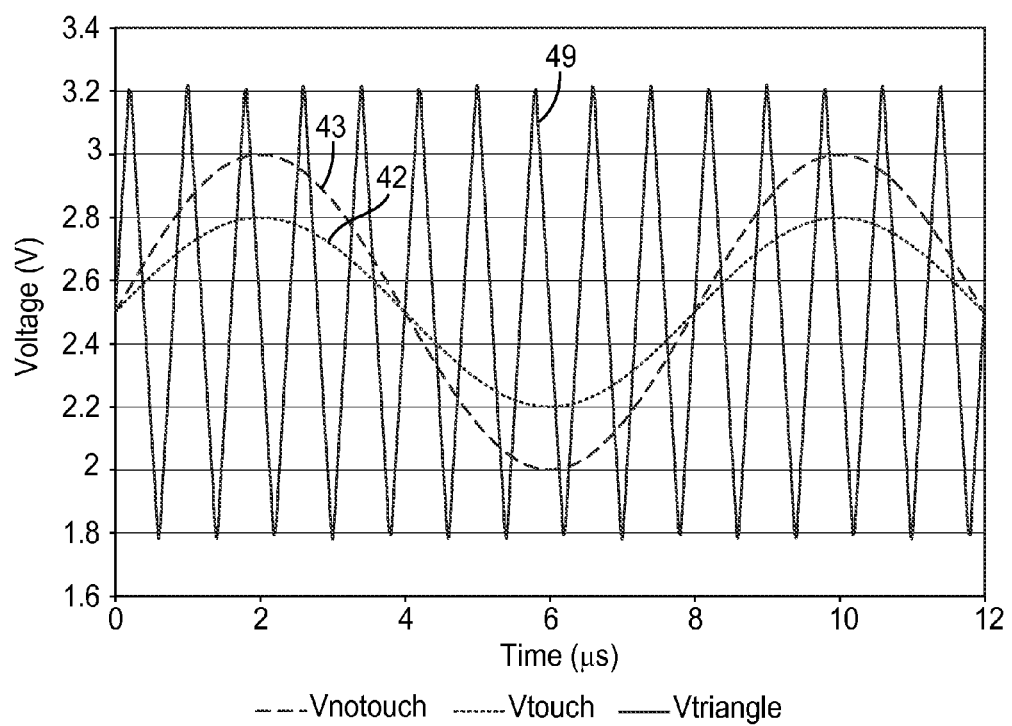
FIG. 10 shows a receive signal in the absence of a touch event, a receive signal when a touch event occurs, and a triangular threshold voltage signal with a frequency greater than the receive signals.
Figure 11:
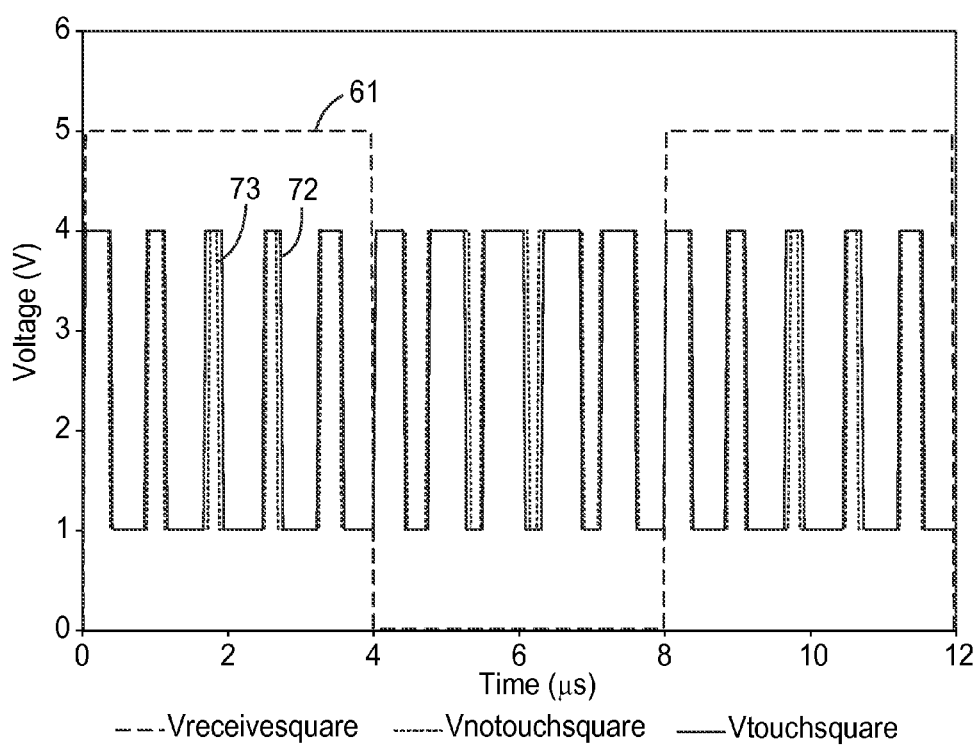
FIG. 11 shows square waves corresponding to a receive signal in the absence of a touch event and a receive signal when a touch event occurs, when a triangular threshold voltage signal with a frequency greater than the receive signals is used.

FIG. 11 shows square waves 72 and 73 corresponding to the output of comparator A2 when the threshold voltage signal 49 is the triangular wave shown in FIG. 9. FIG. 10 also shows a square voltage signal 61 corresponding to the output of comparator A4. When the drive signal has a frequency of 125 kHz, and the oscillator in the microprocessor has a frequency of 100 MHz, the count difference for a given drive cycle is less than the count difference in the embodiment associated with FIG. 8A. For example, the count value for a receive electrode with a touch, corresponding to square wave 62 in FIG. 9, is 300 while the count value for a receive electrode without a touch, corresponding to square wave 63, is 225. Even though the count difference for FIG. 11 is less than that of FIG. 9, the approach taken with respect to FIG. 11 may have improved noise immunity since the threshold voltage signal 49 is transitioning across the receive voltage signals 42 and 43 more quickly.

In some embodiments, the logic block 34 (which in the embodiments described herein comprises a microprocessor) can be programmed with various algorithms to decrease the impact of noise on the touch sensor. For example, the logic block 34 may have a comparison algorithm that compares the counts in a given period to the period on either side of it. If the number of counts in the middle period varies drastically from the first and last periods, this could be indicative of noise interference or some other error. The microprocessor could, for example, then exclude the suspect period from the sample by setting it to the previous sample to eliminate the expected outlier.

EXAMPLE

One embodiment of a touch sensitive device using a threshold voltage signal was constructed as described below.

The sensor electronics were assembled around a Field Programmable Gate Array (FPGA) Development Board marketed under the trade name of Xilinx Spartan-3, from Xilinx, Inc., San Jose, Calif. This FPGA was teamed with two daughter boards. One implemented the receive electronics and the other the drive electronics.

The receive electronics consisted of 16 quad pack opamps, part number OPA4354, from Burr-Brown (now a subsidiary of Texas Instruments, Dallas, Tex., USA) and 32 Maxim quad pack comparators, part number MAX9144, from Maxim Integrated Products, Inc., Sunnyvale, Calif., USA. The different threshold voltages were created with a Digital to Analog Converter (DAC) from Burr-Brown, part number DAC7512, and a standard function generator for the periodic threshold voltages. All conditioned signals from the comparators were sent to the FPGA for measurement.

The drive electronics consisted of a waveform generator (part number AD9833) from Analog Devices, Inc., of Norwood, Mass., USA, an op-amp from Analog Devices (AD8510) to amplify the drive signal, a comparator from Maxim (MAX987) to provide the FPGA with signal used to measure the periods of the drive, and five analog multiplexers from Maxim (DG408). All of the signals to control the multiplexing and setup the waveform generator were provided by the FPGA Development Board.

The drive electronics and the receive electronics were connected to the drive electrodes and the receive electrodes, respectively, of a 19 inch (diagonal) matrix sensor touch panel, available from 3M Touch Systems, Methuen, Mass., USA, 3M part number 98-0003-3367-8. The sensor was made for 3M by ELK Products, Inc., Hildebran, N.C., USA. The sensor consisted of two orthogonal arrays of diamond patterned electrodes on flexible polymer substrates, laminated to a 1.1 mm thick glass touch screen front lens, which could optionally be mounted in front of a display. The sensor panel had a sheet resistance of approximately 250 ohms/square, and an optical transmission >90%.

The FPGA was programmed using VHDL programming code. (VHDL code is commonly used as a design-entry language for field-programmable gate arrays and application-specific integrated circuits in electronic design automation of digital circuits). VHDL comes from VHSIC hardware description language, where VHSIC stands for very-high-speed integrated circuit. VHDL code was implemented both to drive the sensor sequentially for 32 periods of the drive signal (i.e., drive cycle=32 periods) and to measure the receive signal during these 32 periods. A Microblaze soft-core processor was instantiated inside the FPGA using Xilinx Platform Studio11 software. (As a soft-core processor, MicroBlaze is implemented entirely in the general-purpose memory and logic fabric of Xilinx FPGAs.) The Microblaze processor was then programmed to collect the data from the VHDL logic every time the drive line was switched, and to transmit the collected data over the serial port to the host computer. This raw data was then collected to either look at the results live or to post process the data.

The touch sensor system was tested according to the following procedure. The waveform generator was programmed to provide a 125 kHz Sine Drive signal with a peak to peak amplitude of 5 volts. The count values for both a touch and no touch condition were captured using the serial port and a simple software program. Both a DC and sine threshold waveform were used for comparison. In one test the sine wave was set up so the peak to peak voltage was greater than the receive signal (sine windowing the receive signals) and in the other the peak to peak of the receive signal was greater than the sine wave (receive windowing the sine).

The results of these tests are shown in the Table 1:

TABLE 1

| Setup | No Touch Counts | Touch Counts | Touch Delta |
|---|---|---|---|
| 1) 125 kHz sine wave drive signal, DC threshold voltage signal | ~17,000 | ~22,000 | ~5,000 |
| 2) 125 kHz sine wave drive signal, 750 kHz sine wave threshold voltage signal having amplitude above the amplitude of the receive electrode in the absence of a touch | ~7,000 | ~8,500 | ~1,500 |
| 3) 125 kHz sine wave drive signal, 750 kHz sine wave threshold voltage signal having amplitude just less than the amplitude of the receive electrode in the absence of a touch | ~4,400 | ~7,400 | ~3,000 |

Setup 2 versus 3 demonstrate the increased touch delta that may be accomplished by setting the amplitude of the threshold voltage signal to be at or just beneath the peak amplitude that would be seen on the receive electrode in the absence of a touch. This may be better appreciated in reference to FIG. 10, which in concept approximates what would be seen from setup 2, if instead of a triangle reference voltage a sine wave reference voltage were used. Note that the peak amplitude of the reference voltage signal 49 is about 3.2 volts, whereas the peak voltage on the receive signal 43 in the absence of a touch is about 3 volts. Setup 3 shows the improved fidelity that could be accomplished by, in the context of FIG. 10, setting the threshold voltage signal to just under 3 volts.

Note that setups 2 and 3 used a sine wave threshold voltage signal—a triangular wave form or other waveforms would provide even higher touch deltas, as further described herein.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. A touch sensitive apparatus, comprising:
   a touch sensitive device having a plurality of drive electrodes and a plurality of receive electrodes, wherein the drive electrodes are capacitively coupled to the receive electrodes; and
   a touch measurement circuit configured to identify, in response to changes in capacitance via signals carried by the receive electrodes, one or more temporally overlapping touch events on the touch sensitive device, the touch measurement circuit further configured to:
   receive a periodic receive signal carried by at least one of the receive electrodes,
   receive a triangular periodic threshold signal having a frequency that is an integer multiple of a frequency of the periodic receive signal,
   compare the periodic receive signal to the triangular periodic threshold signal during a sampling window,
   determine a length of time during the sampling window that the periodic receive signal amplitude satisfies the threshold signal amplitude, and
   identify a touch event based on the length of time that the periodic receive signal amplitude satisfies the threshold signal amplitude.

2. The touch sensitive apparatus of claim 1, wherein the drive electrodes are capacitively coupled to the receive electrodes by mutual capacitance, and further including
   a signal drive circuit configured and arranged to apply a periodic drive signal to each of the plurality of drive electrodes; and
   wherein the touch measurement circuit further includes a logic circuit configured and arranged to determine the length of time, during each period of the drive signal, that the periodic receive signal amplitude satisfies the threshold signal amplitude
   time duration, during each period of the drive signal, that the first signal amplitude exceeds the threshold signal level.

3. The touch sensitive apparatus of claim 1, further including a signal drive circuit configured and arranged to apply a drive signal with a frequency in the range of 20 kHz-1 MHz to at least one of the plurality of drive electrodes.

4. The touch sensitive apparatus of claim 3, wherein the periodic receive signal amplitude is determined by averaging a plurality of periodic receive signal amplitude samples.

5. The touch sensitive apparatus of claim 1, further including a signal drive circuit configured and arranged to apply a drive signal with a frequency in the range of 50 kHz-500 kHz to at least one of the plurality of drive electrodes.

6. The touch sensitive apparatus of claim 1, wherein the touch measurement circuit identifies a touch event by comparing the length of time that the periodic receive signal amplitude satisfies the threshold signal amplitude with a predetermined length of time indicative of a touch event.

7. The touch sensitive apparatus of claim 6, wherein the predetermined period of time includes a predetermined minimum period of time and a predetermined maximum period of time, wherein the predetermined minimum period of time and the predetermined maximum period of time are periodically updated.

8. The touch sensitive apparatus of claim 1, further comprising a signal drive circuit configured to sequentially apply a sinusoidal drive signal to each of the plurality of drive electrodes.

9. The touch sensitive apparatus of claim 8, wherein the signal drive circuit is further configured to, while applying the sinusoidal drive signal to a particular drive electrode, apply a fixed voltage to at least some of the plurality of drive electrodes that are other than the particular drive electrode.

10. The touch sensitive apparatus of claim 8, wherein the signal drive circuit is further configured to drive the periodic drive signal at a frequency between 70 kHz and 150 kHz.

11. The touch sensitive apparatus of claim 8, wherein the signal drive circuit is further configured to drive the periodic drive signal at a frequency between 100 kHz and 1 MHz.

12. The touch sensitive apparatus of claim 1, wherein the touch measurement circuit includes a counter configured to determine the length of time that the periodic receive signal amplitude satisfies the threshold signal amplitude by counting a number of oscillations of the counter within a period of the sinusoidal drive signal in which the periodic receive signal is above or below the threshold signal level.

13. A method of measuring mutual capacitances in a touch sensitive device having a plurality of drive electrodes and a plurality of receive electrodes, the method comprising:
   applying a periodic drive signal to at least one of the drive electrodes for coupling, by mutual capacitance, to at least two of the receive electrodes;
   receiving a periodic receive signal carried by at least one of the receive electrodes;
   receiving a triangular periodic threshold signal having a frequency that is an integer multiple of a frequency of the periodic receive signal;
   comparing the periodic receive signal to the triangular periodic threshold signal during a measurement cycle;
   determining a length of time during the measurement cycle that the periodic receive signal amplitude satisfies the threshold signal amplitude; and
   identifying a touch event based on the length of time that the periodic receive signal amplitude satisfies the threshold signal amplitude.

14. The method of claim 13, further including
   applying a periodic drive signal to each of the plurality of drive electrodes; and
   determining the length of time during the sampling window that the periodic receive signal amplitude satisfies the threshold signal amplitude, wherein the measurement cycle is defined based on a period of the drive signal.

15. The method of claim 13, further comprising amplifying the periodic receive signal, and further including applying a drive signal with a frequency in the range of 20 kHz-1 MHz to at least one of the plurality of drive electrodes.

16. The method of claim 13, further including applying a drive signal with a frequency in the range of 50 kHz-500 kHz to at least one of the plurality of drive electrodes.

17. The method of claim 16, wherein the periodic receive signal amplitude is determined by averaging a plurality of periodic receive signal amplitude samples.

18. The method of claim 13, wherein the determining step comprises counting a number of oscillations of a counter within a period of the periodic drive signal in which the periodic receive signal satisfies the threshold signal level.

19. The method of claim 13, wherein the identifying step further comprises comparing the length of time to a predetermined length of time associated with an absence of a touch event to the touch sensitive device.

20. The method of claim 13, wherein the applying step further comprises applying a ground voltage level to each of the plurality of drive electrodes to which the periodic drive signal is not currently being applied.

21. An apparatus comprising:
at least one circuit configured to detect the presence of an object in proximity to a first and a second electrode, the first electrode driven with a periodic voltage signal, and the second electrode carrying a periodic voltage signal resulting from the voltage signal on the first electrode capacitively coupling to the second electrode,
the presence of the object detected by comparing the periodic voltage signal to a triangular periodic threshold signal, determining a length of time during the sampling window that the periodic receive signal amplitude satisfies the threshold signal amplitude, and detecting presence of the object based on the length of time that the periodic receive signal amplitude satisfies the threshold signal amplitude.

22. The apparatus of claim 21, further including
a signal drive circuit configured and arranged to apply a periodic drive signal to each of the plurality of drive electrodes.

23. The apparatus of claim 21, further comprising amplifying the periodic voltage signal carried on the second electrode.

24. The apparatus of claim 21, wherein determining the length of time includes, for a measurement cycle, counting a number of oscillations of a counter during which the periodic receive signal is above the threshold signal level, in response to the threshold signal level being positive, or below the threshold signal level, in response to the threshold signal level being negative, wherein the measurement cycle includes one or more periods of the periodic voltage signal.

25. A touch sensitive apparatus, comprising:
a touch sensitive device having a plurality of drive electrodes and a plurality of receive electrodes, wherein the drive electrodes are capacitively coupled to the receive electrodes; and
a touch measurement circuit configured to identify, in response to changes in capacitance via signals carried by the receive electrodes, one or more temporally overlapping touch events on the touch sensitive device, the touch measurement circuit further comprising:
a receive circuit including a first amplifier having an inverting input connected to receive a periodic receive signal carried by at least one of the receive electrodes, the receive circuit further including a second amplifier having an inverting input connected to receive an output of the first amplifier and a non-inverting input connected to receive a threshold signal and that generates a periodic square wave output, the receive circuit further including a logic circuit that receives the periodic square wave output of the second amplifier and determines a length of time during a sampling window that an amplitude of the periodic receive signal amplitude satisfies the threshold signal amplitude based on the periodic square wave output; and
a processing unit that identifies a touch event based on the length of time that the periodic receive signal amplitude satisfies the threshold signal amplitude.

* * * * *

UNITED STATES PATENT AND TRADEMARK OFFICE
CERTIFICATE OF CORRECTION

PATENT NO.        : 8,773,366 B2                          Page 1 of 1
APPLICATION NO.   : 12/618874
DATED             : July 8, 2014
INVENTOR(S)       : Hable et al.

It is certified that error appears in the above-identified patent and that said Letters Patent is hereby corrected as shown below:

On the Title page, Col. 2, Item [56] (Other Publications)
Line 3, delete "compenstion" and insert -- Compensation --

On the Title page, Col. 2, Item [56] (Other Publications)
Line 1, delete "Unkown" and insert -- Unknown --

In the Specification
Column 4
Line 26, delete "118a-e)" and insert -- 118a-e), --

Column 10
Line 11, delete "co12," and insert -- col2, --

Signed and Sealed this
Eleventh Day of November, 2014

Michelle K. Lee
*Deputy Director of the United States Patent and Trademark Office*